May 4, 1943.   W. R. CLARK   2,318,140
VISUAL INDICATOR
Filed March 30, 1942   3 Sheets-Sheet 1
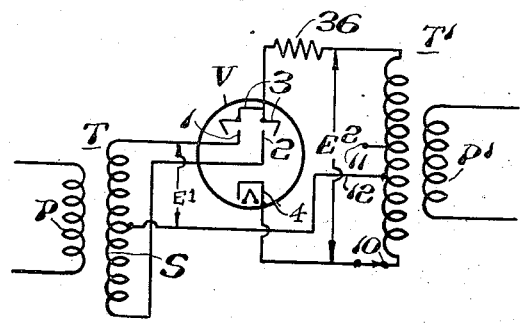
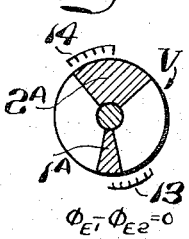
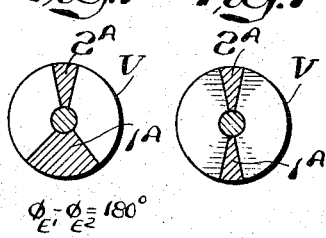
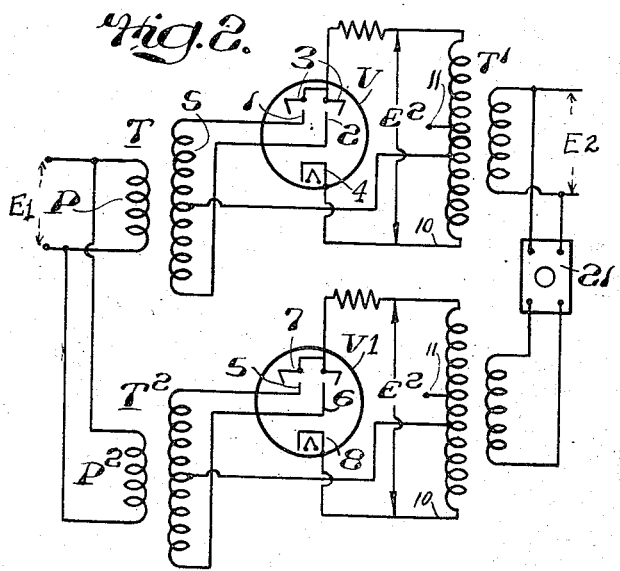
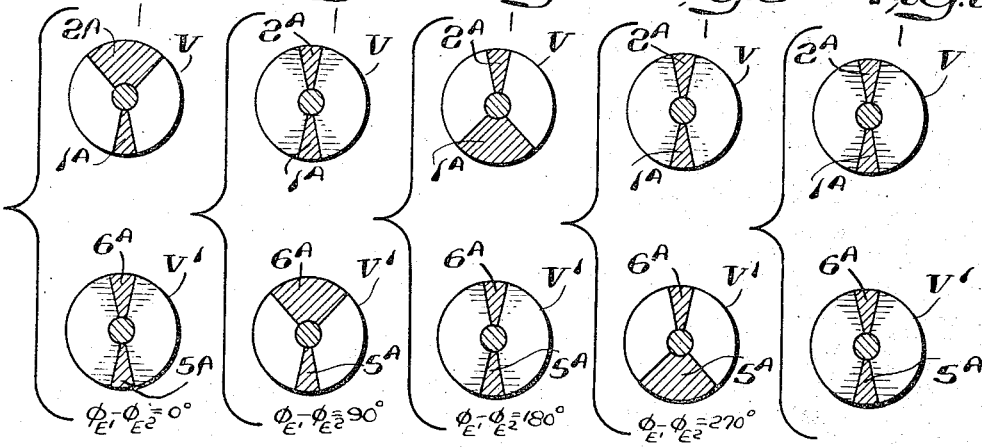
INVENTOR
William Russell Clark
by C. L. Ehret
ATTORNEY May 4, 1943. W. R. CLARK 2,318,140
VISUAL INDICATOR
Filed March 30, 1942 3 Sheets-Sheet 2
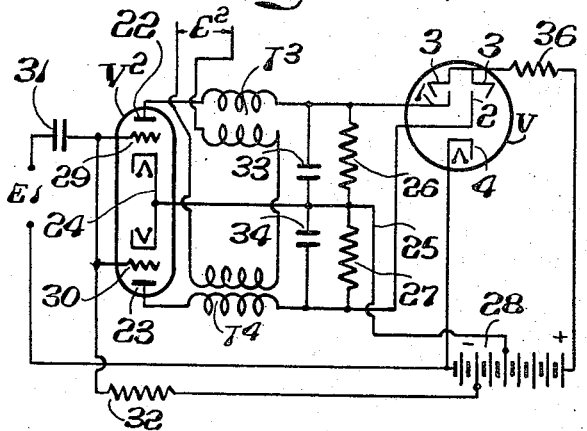
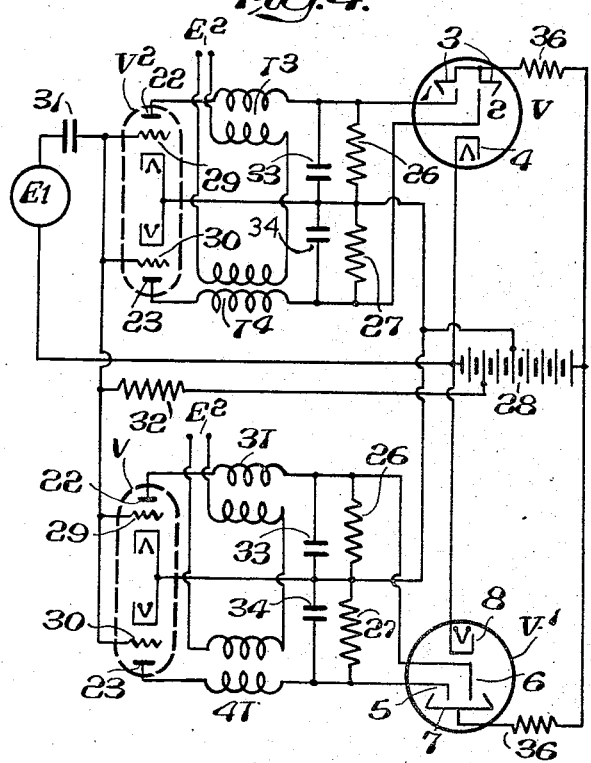
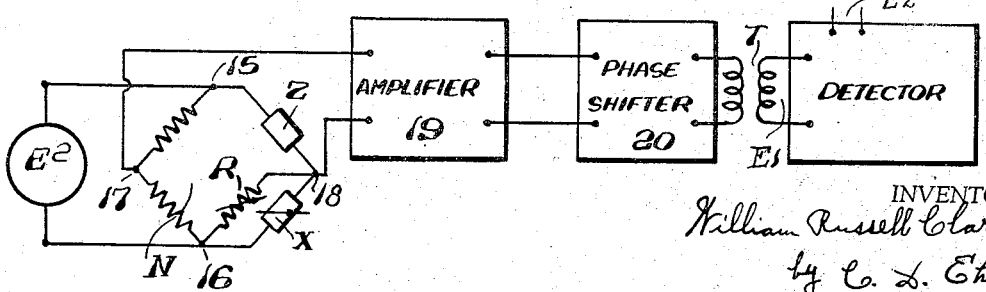
INVENTOR
William Russell Clark
by C. L. Ehret
ATTORNEY INVENTOR
William R. Clark
BY C. D. Ehret
ATTORNEY Patented May 4, 1943

2,318,140

UNITED STATES PATENT OFFICE 2,318,140

VISUAL INDICATOR

William Russell Clark, Abington, Pa., assignor to Leeds and Northrup Company, Philadelphia, Pa., a corporation of Pennsylvania Application March 30, 1942, Serial No. 436,829

11 Claims. (Cl. 172—245)

My invention relates to systems for indicating the magnitude of an alternating electromotive force or voltage and/or the phase relation thereof to another alternating electromotive force or voltage; more particularly, it concerns systems suited for determination of the sense and extent of unbalance of alternating-current bridges, potentiometers, and similar measuring networks.

In accordance with my invention, an alternating voltage of unknown magnitude is applied to affect, oppositely, the potentials of the ray-control electrodes of an electron-ray tube or tubes, and upon either the ray-control circuit or the target circuit of the tube or tubes is impressed another alternating voltage of the same frequency so that, in dependence upon the phase relations of the two voltages, one or the other, or both, of the ray-control electrodes to greater or lesser extent precludes electronic bombardment of associated fluorescent target structure whose beam or shadow pattern therefore affords a visual indication of the magnitude of the unknown voltage and/or its phase relation to the second alternating voltage.

My invention further resides in indicating systems having the features hereinafter described and claimed.

Figure 6:
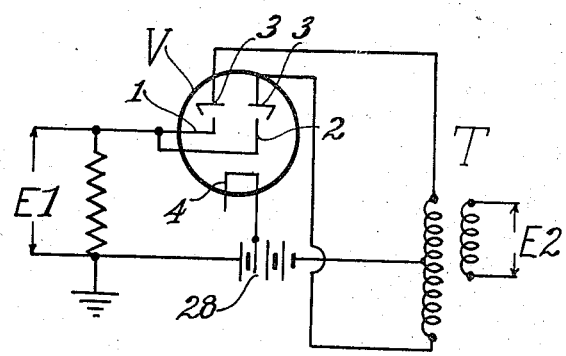
Figure 7:
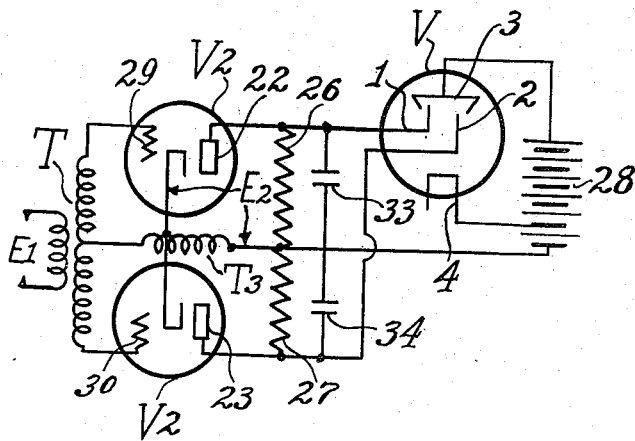

For an understanding of my invention, reference is made to the accompanying drawings, in which:

Figs. 1, 2, 3, and 4 diagrammatically illustrate various detector or indicating systems utilizing electron-ray tubes;

Figs. 1a to 1c, Figs. 2a to 2e, Figs. 3a to 3f and Figs. 4a, 4b are referred to in discussion of the operation of the various systems of Figs. 1 to 4;

Fig. 5 diagrammatically illustrates a measuring network for use with the detector or indicating systems of Figs. 1 to 4;

Figs. 6 and 7 illustrate other modifications.

Referring to Fig. 1, a voltage or electromotive force E1, in general an alternating-current voltage, or the alternating component of a unidirectional voltage, is impressed upon the ray-control electrodes 1, 2 of a twin electron-ray tube V of the 6AF6G type, for example, oppositely to affect their potentials with respect to the potential of the associated cathode 4. Without limitation thereto, the voltage E1 may be produced across the secondary S of transformer T whose primary winding P is traversed by the unbalance current of a measuring network, for example a bridge or potentiometer of which Fig. 5, later herein discussed, is exemplary.

Between the target 3 and cathode 4 of tube V is impressed a varying or alternating voltage E2 supplied in the particular system of Fig. 1 by transformer T1 whose primary P1 is energized with alternating current of the same frequency as voltage E1. The resistor 36 is of suitably high magnitude to preclude the target current from exceeding a safe maximum.

When the voltages E1 and E2 are in phase, one of the electrodes 1, 2 is negative throughout the half cycles of voltage E2 for which the target 3 is positive and the other of the electrodes 1, 2 is positive throughout the half cycles for which target 3 is positive. Consequently as appears in Fig. 1a, the two darkened areas, shadows, or beams of the two sections of the target 3 are unequal; for example the shadow 2A of that section of the target 3 controlled by electrode 2 may be substantially larger than the shadow 1A of the other section of the target controlled by electrode 1; if voltage E1 is sufficiently large, shadow 1A may completely disappear and for still larger magnitudes of voltage E1 the shadow 1A may be replaced by a sector of enhanced brilliance and of angular extent depending upon the magnitude of voltage E1. The frequency of the voltages E1 and E2 is preferably suitably high (usually not less than 25 cycles per second or as high as 10,000 cycles per second or even much higher) so that due to persistence of vision of the observer or the persistence of fluorescence of the target material, the target or ray pattern appears steady or continuous notwithstanding the absence of target current during the half cycles for which the target potential is negative with respect to cathode.

When on the other hand the voltages E1 and E2 are in phase opposition, 180° out of phase, the target or ray pattern reverses, from Fig. 1a to Fig. 1b, because under this circumstance the ray-control electrode 2 is negative and electrode 1 is positive throughout the positive half waves of the target potential.

From the foregoing it is evident that if the target pattern corresponds with Fig. 1a or 1b, voltage E1 is either in phase with, or 180° out of phase with, the biasing voltage E2. If the applied voltage E1 is a direct-current voltage, the target pattern will correspond with Fig. 1a or 1b in dependence upon the poling of its terminals as connected to the ray-control electrodes 1, 2.

For phase differences of alternating voltages E1 and E2 other than 0° and 180°, electrodes 1 and 2 are positive for supplemental fractions of each positive half wave of the target potential with the typical result, shown in Fig. 1c, the edges of the shadows or beams 1A and 2A are indistinct because of associated penumbra. Though these ray patterns may be interpreted in coarse or approximate determination of the phase relation of voltages E1 and E2, it is preferable to shift the phase of E1 or E2 by a calibrated phase-shifting device or network until the pattern of Fig. 1a or 1b is attained; the shift required is a direct measure of the angle between E1 and E2.

When the voltage E1 is of zero or inappreciable magnitude, the shadows or beams 1A and 2A are substantially equal and may be large or small depending upon whether the cathode 4 is connected to tap 10 (which, when the target is positive, is more negative than the connection 12 to the mid-tap of the secondary S, or other point of that same potential) or is connected to tap 11 (which, for the positive half waves of the target potential, is positive with respect to the mid-tap connection 12).

The magnitude of voltage E1 may be read, Fig. 1a and 1b, from calibrated scales 13 and 14 so disposed with respect to the tube V or its target 3 that the edges of the shadows 1A and 2A may co-operate therewith as indices.

Though not limited to such use, the indicating system shown in Fig. 1 may be utilized to detect the unbalance of an alternating-current bridge N, Fig. 5, such as a Maxwell or Hay bridge including in one of its arms an unknown impedance Z comprising substantially pure inductance, capacitance, or resistance, or more usually a combination of resistance and reactance, either inductive or capacitative. Two of the conjugate points 15, 16 of network N are connected to any suitable source of alternating current E2, preferably a source of known frequency, such as a calibrated signal generator or a power line, for example a 110 volt, 60 cycle line: the same source, or another source having the same frequency as and of fixed or known phase with respect to E2, is used to supply the target current of the detector. The other pair of conjugate points 17, 18 of the bridge are connected to the primary P of transformer T, Figs. 1 and 5, to apply to the ray-control electrodes 1, 2 of the electron-ray tube V comprised in the "Detector," Fig. 5, a voltage E1 corresponding in magnitude and phase with the extent and sense of unbalance of the bridge N. For increased sensitivity, an amplifier 19 of suitable number of stages of amplification is or may be interposed between the network N and the transformer T or equivalent device for coupling the network N to the tube V. In advance of, or after, the amplifier 19 is interposed a suitable phase-shifting device or network 20 which for use with the detector of Fig. 1 should be capable of effecting a phase shift between its input and output voltages of at least slightly more than 180°.

In accordance with a preferred procedure for measurement of the resistive and reactive components of impedance Z, first one of the elements R, X is set to minimum and the other set to maximum, the phase-shifter 20 is adjusted until the shadows 1A and 2A are sharply defined, Fig. 1a or 1b, and then the bridge N is balanced for either the "in-phase" or "out-of-phase" component of impedance Z by adjustment of resistance R or reactance X until the corresponding shadow or beam 1A or 2A is at minimum. Then the setting of phase-shifter 20 is changed to effect a 90° shift in phase, or such shift in phase may be effected with regard to E2 in advance of its application to the detector or the bridge, and the bridge N again balanced by adjustment of reactance X or resistance R until the other of the shadows 1A, 2A is reduced to a minimum. This procedure is similar to that employed when a phase-sensitive alternating-current galvanometer is used as the detector of unbalance but the electron-ray tube detector is superior in that high sensitivity is attainable without sacrifice of speed of response and because the same detector may be used for a wide range of frequencies.

In the detector arrangement shown in Fig. 2, two electron-ray tubes V and V1 are used, one as the "in-phase" detector and the other as the "out-of-phase" detector. As in Fig. 1, voltage E1 is impressed upon the ray-control electrode of tube V and a voltage E2 of the same frequency is impressed between the target and cathode; in addition voltage E1 is impressed upon the ray-control electrodes 5, 6 of tube V1 and the wave form of voltage E2 as applied to the target circuit of tube V1 is 90° out of phase with respect to the wave form of its application, in the other branch of the divided target circuit, to the target of tube V. The fixed phase relation of the wave-forms of the target-biasing voltages derived from E2 is obtained by any suitable phase shifting device indicated generically by the rectangle 21; the equivalent effect may be obtained by interposing the phase shifting device 21 in advance of any circuit to V or V1.

In the particular arrangement shown in Fig. 2, the primary P2 of transformer T2 in the ray-electrode circuit of tube V1 is connected in parallel to the primary of transformer T in the ray-electrode circuit of tube V. It shall be understood however, that any other suitable arrangement may be utilized concurrently to impress an unknown voltage E1 upon both branches of the divided input circuit of tubes V, V1.

When the voltage E1, as applied to the ray control electrodes of tubes V and V1, is either in phase, or 180° out-of-phase, with the voltage E2, as applied to the target circuit of tube V, the target or ray pattern of tube V is sharply defined, Fig. 2a and 2c, whereas the shadows or beams 5A, 6A of the target of tube V1 are blurred or indistinctly defined; whereas when the voltage E1 is 90° or 270° out of phase with voltages E2, the target pattern of tube V1 is sharply defined but the shadows 1A and 2A of tube V are blurred and indistinct, Figs. 2b and 2d.

Though not limited to such use, the indicating system of Fig. 2 may be utilized as the "Detector" of the unbalance of an alternating current bridge, Fig. 5; from observation of the tubes V, V1, it is at once evident when the phase difference of the voltages E1 and E2 is either 0°, 90°, 180°, 270° or 360°. For other phase relations both targets 3 and 7 have blurred shadows, Fig. 2e, and phase shifter 20, which for this modification need be capable of shifting phase only slightly more than 90°, is adjusted until the target patterns correspond with one of Figs. 2a–2d.

Thereafter, the resistance R and reactance X may be adjusted to balance both the "in-phase" and "out-of-phase" components of the unknown impedance Z. At all times during the balancing, there is continuously indicated by the tubes V and V1, the extent of "in-phase" and "out-of-phase" unbalance so making it possible for the observer rapidly to effect a precise balance.

When the voltage E1 is of zero or insubstantial magnitude the shadows 1A and 2A are equal and shadows 5A and 6A are equal. With each of the tubes V and V1 may be associated calibrated scales 13, 14 to cooperate with the beams or shadows for indication of the magnitudes of the "in-phase" and "out-of-phase" components of voltage E1.

In the modified form of detector system shown in Fig. 3, the visual indicator as in Fig. 1, is a twin electron-ray tube V, the angular deflection or extents of the beams indicating the magnitude of the applied voltage E1, and the phase of the voltage E1 with respect to voltage E2 determining which section of the target 3 is activated.

The ray-control electrodes 1, 2 of tube V are connected respectively to the anodes 22, 23 of a twin rectifier tube V2, for example one of the 6N7 type, whose cathode 24 is connected through conductor 25 to the cathode 4 of the tube V preferably in series with a fixed biasing voltage derived for example from battery 28 which serves as a source of target current for tube V, and as a source of biasing potential for grids 29, 30 of tube V2. The voltage E2, of the same frequency as the voltage E1, is applied to the anode circuits of tube V2, as by the transformers T3, T4 whose secondary windings are in circuit respectively with the load resistances 26, 27 connected respectively between the cathode connection 25 and the ray-control electrodes 1 and 2.

One pole of the source of voltage E1 is connected to the cathode 24 of the tube V2 and the other pole thereof is connected to the grids 29, 30 associated respectively with rectifier anodes 22 and 23.

The blocking condenser 31 prevents direct current, from the source of biasing voltage applied to grids 29, 30 through the resistance 32, from flowing through the alternating current input circuit including E1.

When the voltage E1 is of zero or negligible magnitude, the potentials of the ray-control electrodes 1 and 2 with respect to cathode 4 are equal and the beams or shadows 1A, 2A are equal, Fig. 3f.

When the voltages E1, E2 are "in-phase" or 180° "out-of-phase," the potential of one of the grids 29 and 30 is positive throughout the positive half-wave of the potential of the associated anode, 22 or 23; accordingly the direct-current potential of one of the ray-control electrodes 1 and 2 becomes less negative (or more positive) and the direct-current potential of the other of electrodes 1 and 2 becomes more negative (or less positive) causing the beam pattern of the target to have the appearance shown in Fig. 3a or 3c. Assuming E1 is of variable magnitude, its existing magnitude is read, for zero phase difference between E1 and E2, from beam 1A, Fig. 3a, and for 180° phase difference from beam 2A, Fig. 3c.

Figs. 3b, 3d and 3e show the target pattern when the phase relations of the voltages E1 and E2 are as specified below those figures (for Figs. 3d and 3e, E1 or E2 has been shifted 90° with respect to their relation for Figs. 3a and 3c).

Preferably the load resistance 26 and 27 of the rectifier circuits are of suitably high magnitude, for example 50,000 ohms, and are shunted by condensers 33, 34 of suitably large magnitude, for example, 2 microfarads, when E1 and E2 are of a frequency of 60 cycles, or about .1 mfd. when the frequency is of the order of 1000 cycles, to insure sharpness of definition of the shadows or beams 1a and 2a; the condensers smooth out the alternating current components of the unidirectional currents passed by the rectifiers.

Fig. 4 bears the same relation to the system shown in Fig. 3 that the arrangement of Fig. 2 bears to the system of Fig. 1; more particularly the circuit arrangements shown in the upper and lower parts of Fig. 4 are each identical with that shown in Fig. 3, except that the wave form of the voltage E2 as supplied by transformers 3T, 4T to the lower half of the detector arrangement is 90° "out-of-phase" with respect to the wave form of the voltage E2 as applied to the upper pair of rectifiers comprised in tube V2. Figs. 4a and 4b illustrate two of the beam patterns for the conditions thereunder specified; from consideration of the principles of operation of the system of Figs. 2 and 3, other phase relations will be recognized from the beam patterns.

When this detector system is utilized with the measuring arrangement of Fig. 5, or equivalent, the phase-shifter 20 need only provide for slightly more than a 90° shift in phase whereas when Fig. 5, or equivalent measuring network, is used with the detector system of Fig. 1 or 3 the phase-shifter 20 should provide for a phase shift between its in-put and out-put voltages of slightly more than 180°.

With the modification shown in Fig. 6, the target patterns are the same as for the system of Fig. 1. Voltage E1 is applied to effect in-phase variation of the potentials of the ray-control electrodes 1, 2 whereas voltage E2 is applied to effect variation of the potentials of the associated targets in phase-opposition. Accordingly transformer T with center-tapped secondary T is in the target circuit, Fig. 6, instead of in the input or ray-control circuit as in Fig. 6.

The modification shown in Fig. 7 is similar to that of Fig. 3 and affords the same target patterns. However voltage E2 is introduced into the common cathode return circuit of the two rectifiers by a single transformer T3, or equivalent, instead of by two transformers, as in Fig. 3, between the load resistors 26, 27 and the rectifier anodes.

It shall be understood that in all modifications any of the twin electron-ray tubes may be replaced by a pair of electron ray tubes each having a single ray-control electrode, target and cathode; and that for any of the dual-triodes of Figs. 3 and 4 may be substituted two individual tubes of construction suited, by internal or external connections, to be equivalent of a triode or grid-controlled rectifier. For brevity in the appended claims, the term "twin tube" as applied to any of tubes V—V3 shall be understood to comprehend the case when all electrodes are within a single bulb or envelope as well as the case when the same functional relations are established by grouping of the electrodes in two bulbs or envelopes, all as known in the art.

What I claim is:

1. A system for visually indicating the phase relation of two alternating voltages comprising electron-ray tube means having ray-control electrodes in an input circuit and associated target structure in another circuit, means for applying one of said alternating voltages to affect, oppositely, the potentials of said ray-control electrodes, and means for impressing the other of said alternating voltages upon either one of said circuits whereby said voltages jointly determine the ray pattern on the target structure.

2. A system for visually indicating the phase relation of two alternating voltages comprising electron-ray tube means having ray-control electrodes in an input circuit and associated target structure in another circuit, means for impressing one of said alternating voltages upon the input circuit to affect, oppositely, the potentials of said ray-control electrodes, and means for impressing the other of said alternating voltages upon the other of said circuits to vary the potential of the target structure whereby said voltages jointly determine the ray pattern on the target structure.

3. A system for visually indicating the phase relation of two alternating voltages comprising electron-ray tube means comprising two pairs of ray-control electrodes in a divided input circuit and target structure associated with each pair of electrodes in a divided output circuit, means for impressing one of said voltages upon said input circuit to vary, oppositely, the potentials of the electrodes of each of said pairs and to vary the difference of potential between one pair of ray-control electrodes in predetermined phase relation to the difference of potential between the other pair of ray-control electrodes, and means for impressing the other of said voltages upon either one of said divided circuits and in quadrature as between the branches thereof whereby the beam patterns of said target structures indicates quadrature phase relations of said voltages.

4. A system for visually indicating the phase relation of two alternating voltages comprising electron-ray tube means comprising ray-control electrodes and associated target structure, a source of unidirectional current in circuit with said target structure, and means for controlling the potentials of said ray-control electrodes comprising grid-controlled rectifiers in circuit therewith, means for impressing one of said voltages upon the anodes of said rectifiers, and means for impressing the other of said voltages upon the grids of said rectifiers.

5. A system for visually indicating the phase relation of two alternating voltages comprising a twin electron-ray tube comprising a pair of ray-control electrodes and common target structure, means for applying one of said voltages to affect, oppositely, the potentials of said ray-control electrodes, and means for applying the other of said voltages to vary the potential of said target structure.

6. A system for visually indicating the phase relation of two alternating voltages comprising a pair of twin electron-ray tubes each comprising a pair of ray-control electrodes and common target structure, means for applying one of said voltages to affect, oppositely, the potentials of the ray-control electrodes of each of said tubes, and means for applying the other of said voltages to vary the potentials of said target structures in quadrature phase relation to each other.

7. A system for visually indicating the phase relation of two alternating voltages comprising a pair of twin electron-ray tubes each comprising a pair of ray-control electrodes and associated target structure, means for supplying unidirectional current to said target structures, a pair of grid-controlled rectifiers respectively connected to each pair of said electrodes, means for applying one of said voltages to vary the potentials of the four anodes of the rectifiers in quadrature phase relation, and means for applying the other of said voltages to vary the potentials of the rectifier grids in phase with each other.

8. A system for visually indicating the magnitude of an alternating voltage and its phase relation to a second alternating voltage comprising a twin electron-ray tube having a pair of ray-control electrodes and an associated target, means for applying the first named voltage to vary the potentials of said control electrodes in 180° phase relation, means for applying the second alternating voltage to vary the potential of said target whereby the ray pattern thereof indicates the phase relations of said voltages, and scale structure co-operative with said ray pattern to indicate the magnitude of said first-named voltage.

9. A system for visually indicating the phase relation of two alternating voltages comprising electron-ray tube means having a pair of ray-control electrodes in an input circuit and a pair of associated target electrodes in another circuit, means for applying one of said alternating voltages to one of said circuits to affect, oppositely, the potentials of the electrodes of one of said pairs, and means for impressing the other of said alternating voltages upon the other of said circuits whereby said voltages jointly determine the target patterns.

10. A system for visually indicating the phase relation of two alternating voltages comprising electron-ray tube means having a pair of ray-control electrodes in an input circuit and a pair of associated target electrodes in another circuit, means for applying one of said alternating voltages to affect, oppositely, the potentials of the target electrodes, and means for applying the other of said alternating voltages to effect in-phase variations of the potentials of the ray-control electrodes.

11. A system for visually indicating the magnitude of an alternating voltage and its phase relation to a second alternating voltage comprising a twin electron-ray tube having a pair of ray-control electrodes and an associated target, grid-controlled rectifiers in circuit with said control electrodes, means for applying said first-named alternating voltage to vary, in phase, the potentials of the grids of the rectifiers, means for applying the second alternating voltage to vary the potentials of the anodes of the rectifiers in 180° phase relation to each other whereby the ray pattern of the tube indicates phase relations of said voltages, and scale structure co-operative with said ray pattern to indicate the magnitude of said first-named voltage.

WILLIAM RUSSELL CLARK.